May 16, 1967 R. S. WOOLDRIDGE 3,319,860

TAPE TRANSPORT SYSTEM

Filed April 30, 1965 2 Sheets-Sheet 1

INVENTOR.
ROBERT S. WOOLDRIDGE
BY Edward M. Hassell
ATTORNEY

May 16, 1967 R. S. WOOLDRIDGE 3,319,860

TAPE TRANSPORT SYSTEM

Filed April 30, 1965

2 Sheets-Sheet 2

3,319,860

TAPE TRANSPORT SYSTEM

Robert S. Wooldridge, Norristown, Pa., assignor to Sperry Rand Corporation, New York, N.Y., a corporation of Delaware Filed Apr. 30, 1965, Ser. No. 452,252

11 Claims. (Cl. 226—95)

This invention relates to tape transport systems, and more particularly to control circuits for moving and stopping magnetic tape.

In magnetic tape transport systems used with computers, it is necessary to drive the tape in either of two directions across a magnetic recording head, to permit reading and writing operations. It is also necessary to stop the tape at certain times.

It is well-known that the mechanical components associated with computer systems are much slower in operation than the electrical components within the system. Therefore, anything which tends to speed up the operation of the mechanical input equipment tends to be of great value with respect to the entire computer system.

It is an object of this invention to provide an improved control circuit for controlling tape movement.

It is a further object of this invention to provide an improved tape control system in which the tape may be moved in either direction or stopped in a minimum amount of time.

In accordance with the present invention, a tape transport system for driving tape in either of two directions is provided. The system includes a pair of counter-rotating capstans for driving the tape and a pair of brakes for braking the tape. A valve mechanism is associated with each of the capstans and brakes for selectively applying either a low or high pressure thereto to cause engagement or disengagement with the tape. A plurality of coils are disposed to selectively actuate the valves. Pulse signals are gated to selected ones of the coils so that low pressure is applied to one of the capstans to cause tape to be engaged and high pressure is applied to the other capstan and two brakes to cause said tape to be disengaged whereby the tape is driven in a predetermined direction. The source of pulse signals is also used for braking and changing the directions of the tape by selectively applying vacuum to one of the four elements, and high pressure to the other three.

Other objects and advantages of the present invention will be apparent and suggest themselves to those skilled in the art, from a reading of the following specification and claims, in conjunction with the accompanying drawing, in which:

Figure 1:
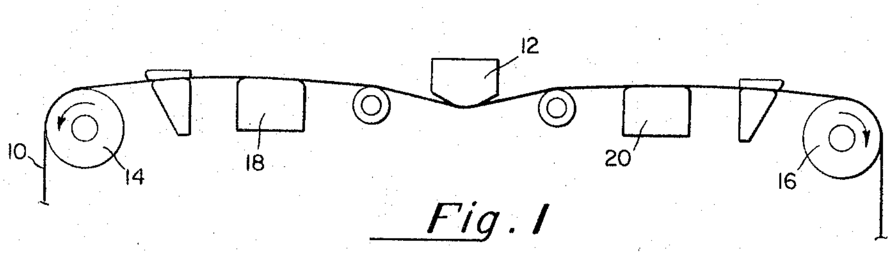
FIGURE 1 is a block diagram illustrating a general tape transport system in which the present invention may be employed.

Referring particularly to FIGURE 1, the main components in a typical tape transport system are illustrated. A magnetic tape 10 is adapted to be moved across a magnetic head 12 to cause stored information to be read from the tape or to permit information to be written on the tape. A pair of counter rotating capstans 14 and 16 are disposed to move the tape in a selected direction across the magnetic head 12. For example, if it is desired to move the tape toward the left a vacuum or low pressure may be applied to the capstan 14 which is moved in a counter clockwise direction. This causes the tape 10 to engage the capstan 14 to be driven thereby. At the same time, a relatively high pressure may be applied to the capstan 16 which may be rotating in a clockwise direction. This causes the tape 10 to be pushed away from the capstan 16.

Rotating capstans which may have high or low fluid pressure applied thereto to cause engagement or disengagement of the tape are well-known to those skilled in the art. In general, a valve mechanism may be actuated to cause either a high or low fluid pressure to be applied to the selected capstan.

A pair of brake elements 18 and 20 are provided to stop the tape. When the tape is to be moved, a relatively high fluid pressure is applied to both the brake elements 18 and 20 to cause the tape 10 to be disengaged therefrom. When it is desired to stop the tape, a relatively low pressure is applied to a selected one of the brake elements 18 and 20 dependent upon the direction in which the tape is being moved. If the tape is being moved to the right and is to be stopped, low pressure is applied to the brake element 18. If the tape is moving to the left, low pressure is applied to the element 20.

In operation, the low pressure or vacuum is applied to one of the four elements illustrated, that is, one of the capstans or one of the brake elements. At the same time a relatively high pressure is applied to the remaining three elements.

Figure 2:
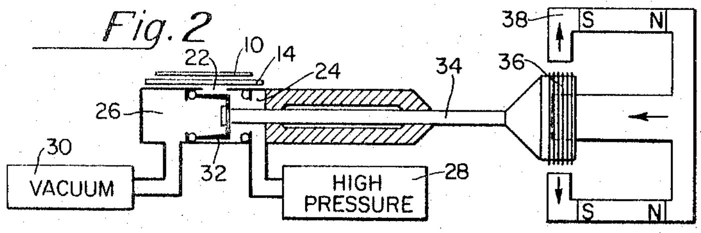
FIGURE 2 represents one type of valve which may be used with the present invention.

Referring particularly to FIGURE 2, a valve mechanism which may be used in the present invention is illustrated. The valve mechanism used may be substantially the same for both capstans and both brake elements illustrated in FIGURE 1.

The magnetic tape 10 is disposed over an aperture 22 to cause the tape to move toward the elements involved or away from the element involved dependent upon whether the aperture 22 leads to a high pressure chamber 24 or to a low pressure or vacuum chamber 26. The element, for example, may be the capstan 14. The high pressure chamber 24 is connected to a source of high pressure 28 and the chamber 26 is connected to a source of low pressure or vacuum 30. A movable valve element 32 is moved either to the left or to the right dependent upon whether it is desired to apply vacuum or pressure to the magnetic tape 10.

The movable element or valve 32 is connected to a connecting rod 34 having a coil 36 disposed at one end thereof. The coil 36 comprises a pair of windings wound in opposite directions. The coil 36 is disposed to be moved within a magnetic field created between the pole pieces of a magnet 38.

The particular valve mechanism for connecting low and high fluid pressure sources to the tape 10 is not particularly related to the present invention and therefore the precise mechanical configuration of the valve involved is not shown in detail. The valve illustrated in FIGURE 2 is shown merely to clarify some of the subsequent explanation relating to the control circuit of the present invention.

A valve mechanism, such as the one roughly illustrated in FIGURE 2, may be actuated by applying an electrical pulse signal to one of the half windings of the coil 36. The movable element 32 may be moved toward the right by the application of a signal to one half of the coil 36. It may be also moved to the left by the application of the appropriate signal to the other half winding of the coil 36. It is noted, however, that if no signal is applied to the coil 36, the movable element 32 will be forced to the left by the source of relatively high pressure 28. In other words, the element 32 will be pushed so that pressure is applied to the tape 10 at all times in the absence of a signal applied to the coil 36. In some cases, even though the element 32 will normally be moved to the left, it may be desirable to apply a signal to the winding 36 to accelerate this action.

Figure 3:
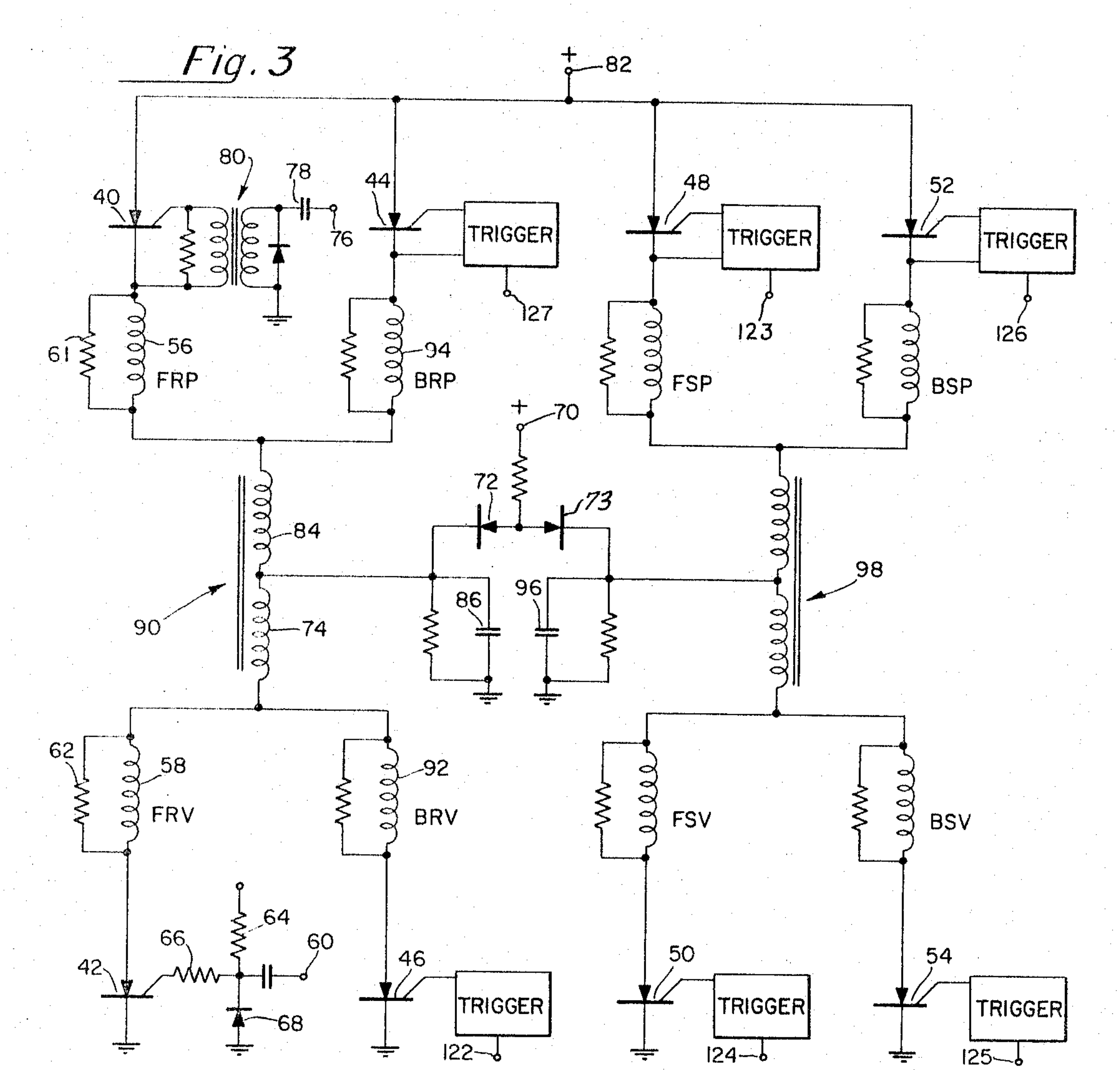
FIGURE 3 is a schematic circuit diagram illustrating a control circuit, in accordance with the present invention.

Referring particularly to FIGURE 3, eight substantially simliar circuits include silicon controlled rectifiers 40, 42, 44, 46, 48, 50, 52 and 54. As is well known to those skilled in the art, silicon controlled rectifiers include an anode, a cathode and a gating electrode. These rectifiers have a characteristic that they are normally non-conducting. However, once they are made conducting by the application of gating signals to the gating electrodes, they will continue to conduct even after the termination of the input gating signals.

In describing the present circuit, the circuitry associated with the silicon controlled rectifiers 40, 42, 44 and 46 may be the circuitry for actuating the capstans 14 and 16, such as illustrated in FIGURE 1. These rectifiers are actuated by the application of input signals to terminals, as indicated. The circuitry associated with silicon controlled rectifiers 48, 50, 52 and 54 may be associated with the brake elements 18 and 20 of FIGURE 1. These rectifiers are also actuated by input signals applied to input terminals 123, 124, 125 and 126, respectively.

As may be seen from FIGURE 2, either low or high pressure must be applied to the capstans 14 and 16 and the brake elements 18 and 20. Consider for purposes of explanation that the circuitry associated with the silicon controlled rectifiers 40 and 42 is that which controls the pressure or vacuum applied to the rotating capstan 14. Windings 56 and 58 may comprise the two halves of the coil wound in different directions, such as the coil 36 discussed in connection with FIGURE 2. The resistors 61 and 62 across the windings 56 and 58 provide a by pass path for the high current resulting from the back E.M.F.'s developed across the windings.

If it is desired to provide a vacuum to the capstan 14 a trigger pulse is applied to an input terminal 60 through a capacitor 62 to drive the silicon controlled rectifier 42 to a conducting state. Resistors 64 and 66 and a diode 68 merely provide means to supply the proper operating and bias potential to the silicon controlled rectifier 42.

When the silicon controlled rectifier 42 becomes conducting, a holding current is applied from a terminal 70, through a diode 72, through a winding 74 which comprises one half of an extinguish transformer 90, through the coil 58, through silicon controlled rectifier 42 to a point of reference potential, designated as ground. Under these conditions, the current in the coil 58 keeps an associated valve in a position so that low pressure or vacuum is continuously applied to the capstan 14. At the same time, it is noted that the silicon controlled rectifier 40 is non-conducting and no current flows through the coil 56. Consequently, no high pressure can be applied to the capstan 14.

When it is desired to apply pressure to the capstan 14, the silicon controlled rectifier 40 must be made conductive to permit current to flow through the coil 56. When this condition is desired, a pulse signal is applied to an input terminal 76, through a capacitor 78 and a transformer 80 to the gating electrode of the silicon controlled rectifier 40. A transformer input circuit is used so that the cathode of the rectifier 40 may be kept above ground. When the silicon controlled rectifier 40 is made conducting, current flows from a source of potential at terminal 82, through the silicon controlled rectifier 40, through winding 56, through winding 84, through a capacitor 86 and a resistor 88 connected in parallel, to ground.

As is well known, when a silicon controlled rectifier starts to conduct, it will remain conducting until it is put off by some appropriate signal applied thereto. One of the purposes of the transformer 90 is to provide an extinguish signal to cause a conducting rectifier to become non-conducting. When current flows through the coil 84, a voltage is induced in the coil 74 to cause a voltage to be applied to the silicon controlled rectifier 42 causing it to become non-conducting. It is thus seen that only one of the silicon controlled rectifiers 40 and 42 is conducting at the same time.

In considering the operation of the extinguish transformer 90, first consider that the silicon controlled rectifier 40 is conducting and it is desired to make the rectifier 42 conducting and to cut off the rectifier 40. At this point, when the rectifier 40 is conducting, the charge at the capacitor 86 is close to the potential of the terminal 82. The capacitor 86 may be considered as being charged.

When the silicon controlled rectifier 42 is made conductive as a result of a trigger signal applied thereto, the capacitor 86 discharges through the winding 74 at a relatively high rate. The current through the winding 74 induces a voltage across the winding 84 resulting in a voltage being applied to the cathode of the silicon controlled rectifier 40 to cause the latter device to become non-conducting. It is understood that no trigger signal is now being applied to the terminal 76.

Thus it is seen that the application of single signals acts to cause one rectifier to become conductive while turning off another rectifier. This is accomplished by the unique extinguish transformer arrangement in combination with the charging and discharging of a capacitor.

If the silicon controlled rectifier 40 is then made conducting as a result of a trigger signal being applied thereto, the capacitor 86 will charge up at a relatively high rate of current through the winding 84 as a result of the potential at terminal 82. The current through the winding 84 induces a voltage across the winding 74. The voltage across the winding 74 is of such a polarity that, when applied to the anode of the silicon controlled rectifier 42, makes it non-conducting.

The silicon controlled rectifiers 44 and 46 may be associated with the capstan 16 of FIGURE 1. The operation of the circuitry associated with these silicon controlled rectifiers is substantially the same as the operation just described in connection with the circuitry associated with the silicon controlled rectifiers 40 and 42. Thus, when it is desired to apply vacuum or low pressure to the capstan 16, the silicon controlled rectifier 46 is made conductive and a holding current is applied to the winding 92 from the source 70. The silicon controlled rectifier 44 is non-conducting and no current flows through the winding 94. The logic control system, to be described, will control which of the selected silicon controlled rectifiers will be conducting and which will be non-conducting. The logic is designed so that the silicon controlled rectifiers 42 and 46 are never both conducting at the same time. Likewise, the silicon controlled rectifiers 40 and 44 will not be conducting at the same time.

The silicon controlled rectifiers 48 and 50 may be associated with the brake element 18 of FIGURE 1. Likewise the silicon controlled rectifiers 52 and 54 may be associated with the brake element 20. The operation of the circuitry involved is substantially the same as that described and therefore will not be described further. It is sufficient to say that the brake element 18 will receive either a high or low pressure dependent upon which of the silicon controlled rectifiers 48 or 50 is conducting. The same is true of the brake element 20 with respect to the silicon controlled rectifiers 52 and 54. The circuit to the right of FIGURE 3 operates substantially the same as the circuit described to the left, including the operation of the capacitor 96 and the extinguish transformer 98.

The circuit described provides power pulses from the terminal 82 by alternately charging and discharging capacitors 86 and 96. The circuit only draws power from the power supply during the charge cycle. The capstan system is such that two valves are always actuated at the same time, one going from pressure to vacuum and one going from vacuum to pressure. One unique feature of the circuit is the arrangement of the coils. On each actuation cycle one capacitor is being charged while the other is being discharged. Thus, only one power pulse comes from the power supply instead of two. The circuit is also so arranged that eight coils are powered by two capacitors instead of four. The circuit arrangement also provides for an even flow of holding current from the power supply. The "diode switch" provided by the diodes 72 and 73 directs the holding current to the proper coil automatically.

The following table of abbreviations is given in order to clarify the explanation of the logic circuitry included in a computer system to generate the control signals which are applied to the circuit illustrated in FIGURE 3.

*Table of abbreviations*

Figure 4:
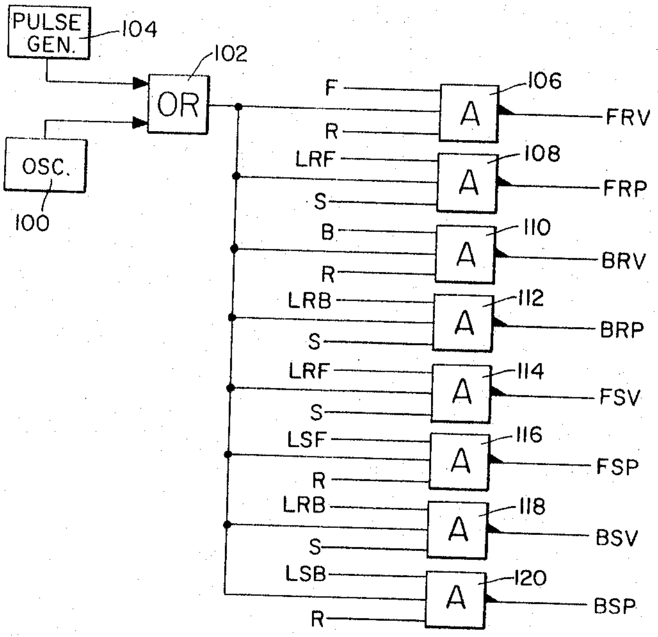
FIGURE 4 is a block diagram illustrating the logic which may be used to provide signals to the control circuit of FIGURE 3, in accordance with the present invention.
Figure 5:
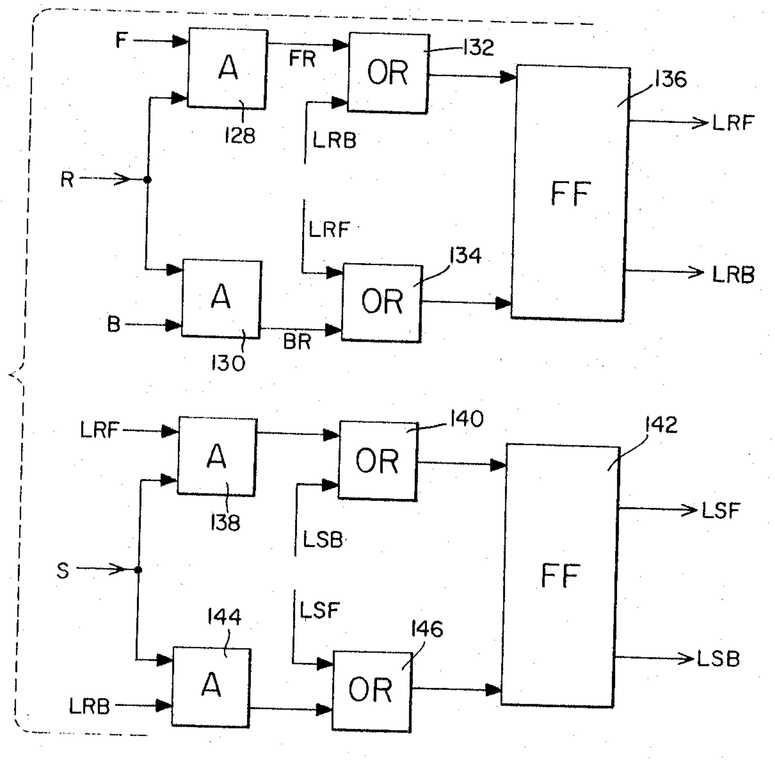
FIGURE 5 is a block diagram illustrating logical circuitry which may be used for generating control signals to actuate the circuit of FIGURE 4, in accordance with the present invention.

F—Forward Signal
B—Backward Signal
R—Run Signal
S—Stop Signal
LRB—Last Run Backward Signal
LRF—Last Run Forward Signal
LSB—Last Stop Backward Signal
LSF—Last Stop Forward Signal
FRV—Forward Run Vacuum
FRP—Forward Run Pressure
BRV—Backward Run Vacuum
BRP—Backward Run Pressure
FSV—Forward Stop Pressure
BSV—Backward Stop Vacuum
BSP—Backward Stop Pressure Before considering the logic diagrams of FIGURES 4 and 5, it is noted that circuitry provided in the tape transport system used will indicate present and immediate past conditions of operation of the tape, i.e., whether it is moving forward, backward or stopped. If a tape has been running forward and then stopped, a last stop forward or LSF signal will be produced in a system. If the tape has been running backward and is then stopped, a last stop backward or LSB signal will be produced in the system. If the tape is moving forward, a last run forward or LRF signal will be produced in the system. If the tape is moving backward, a last run backward or LRB signal will be produced in the system.

Of course, various signals representing forward, run, backward and stop signals are also produced in the system. Various combinations of signals are used to obtain the desired operation of the tape transport system illustrated in FIGURE 1.

As noted in connection with FIGURE 1, the capstans 14 and 16 will move the tape in either of two directions dependent upon which capstan receives low pressure. If the tape is moving forward to the left and is to be stopped, vacuum or low pressure will be applied to the brake element 20. If the tape is moving backward toward the right and is to be stopped, the brake element 18 will receive a low pressure or vacuum.

Referring particularly to FIGURE 4, an oscillator 100 is used to generate a series of trigger pulses to be applied to trigger circuits illustrated in FIGURE 3. The output pulse signals from the oscillator 100 are applied to an OR gate circuit 102. Output pulse signals are also applied to the OR gate 102 from a pulse generator circuit 104. The pulse generator circuit 104 generates a start and stop pulse only at the beginning and end of a particular operation so that the actuation of the circuits in the tape transport mechanism will commence immediately rather than having to wait for a pulse signal from the oscillator 100. For example, the start and stop times may be between the pulses generated by the oscillator 100. The utilization of the pulses from the pulse generator 104 minimizes the time required for starting and stopping when the start and stop times occur between the pulses of the oscillator.

Output pulse signals applied from the OR gate 102 are applied to a series of AND gates 106, 108, 110, 112, 114, 116, 118, and 120. In order for the AND gates to generate an output signal, various other signals must also be applied. It is noted that the eight AND gate circuits produce output trigger signals to be applied to the silicon controlled rectifiers 40, 42, 44, 46, 48, 50, 52 and 54 illustrated in FIGURE 3.

In order to explain the operation of FIGURE 4, let us also consider FIGURES 1 and 3 and assume that it is desired to run the tape 10 (FIGURE 1) in a forward direction. This forward direction generally means that the tape is to be moved toward the left. Within the computer system, there will be generated various signals to indicate forward, backward, run, stop, and other appropriate signals.

If it desired to move the tape forward, the capstan 14 must have a low pressure applied thereto and the capstan 16 must have a high pressure applied thereto. The brake elements 18 and 20 must also have high pressure applied thereto.

Referring to FIGURE 3, the silicon controlled rectifier 42 must be made conducting by the application of a forward run vacuum signal applied to the input terminal 60.

If the tape is to be moved in a forward direction, in addition to the trigger pulse from the oscillator 100 or from the pulse generator 104, a forward signal designated F along with a run signal (R) must be applied to the AND gates 106. When these three signals are present, the AND gate circuit 106 will generate a forward run vacuum (FRV) signal. This signal will cause the silicon controlled rectifier 42 to become conductive in a manner previously described. The AND gate 116 will also generate an output signal but this merely provides pressure to one of the brake elements, a desirable condition. This latter signal also produces an extinguish signal for the rectifiers 50 and 54.

When the AND gate 106 is generating an FRV trigger signal, the AND gate 108 will not generate any signal FRP because no stop signal is applied to its input. The AND gate circuit 110 will not generate a BRV because no back signal is applied to its input. The AND gate circuit 112 will not generate a trigger signal since no stop signal is applied to its input. The AND gate circuit 114 will not generate an output signal because no stop signal is applied to its input. The AND gate circuit 118 will not generate an output signal because no stop signal is applied to the input. The AND gate circuit 120 will not generate an output signal since no LSB signal is applied thereto.

It is noted that signals from the oscillator 100 are continuously applied to all the AND gate circuits. If it is now desired to move the tape backward, i.e., to the right, various other signals will be applied to the AND gate circuits to produce the appropriate output trigger signal to bring about this operation. It is realized, of course, that the tape must first be stopped before it can be run backwards thus a forward run stop FRS will be developed prior to the backward movement of the tape. With no forward signal applied to the AND gate 106 no output signal FRV will be developed. AND gates 108, 112, 114 and 118 will not produce output signals since no stop signal is applied thereto. However, the AND gate 110 will produce an output signal BRV since a backward, a run and a trigger signal from the oscillator 100 are applied to its input. The AND gate circuit 116 will produce an output signal FSP since a R and a LSF are applied thereto but this merely results in the application of high pressure to one of the brake elements.

If it is desired to stop the tape, vacuum must be applied to one of the brake elements 18 or 20. Pressure must be applied to the other brake element, as well as to the two capstans 14 and 16. Let us first assume that it is desired to stop the tape when it is moving in a backward direction toward the right. In this case, the last run signal was LRB.

In this case, no output signal will be developed at AND gates 106, 108, 110, 114, 116 and 120. However, since a trigger signal from the OR gate 102, an LRB signal and a stop signal is applied to the AND gates 112 and 118, a BSV signal will be developed at the output of the AND gate 118 and a BRP signal is developed at the output circuit of the AND gate circuit 112. The output signal from the AND gate circuit 118 is applied to input terminal 125 and used to trigger the silicon controlled rectifier 54 which will cause the flow in the associated winding to actuate a valve to permit a vacuum to be applied to the brake element 18. At this time, high pressure is applied to the brake element 20 and the two capstans 14 and 16. While a trigger signal from AND gate circuit 112 is applied to input terminal 127 to trigger the rectifier 44, this results in pressure being applied to a capstan, which is a desirable condition. However, the conduction of the diode 44 also provides an extinguish signal as described.

If the tape is moving in a forward direction, i.e., toward the left, this will indicate that the last run signal was toward the left, i.e., LRF. In order to stop the tape, it is now desired to apply vacuum to the brake element 20 and high pressure to the brake element 18, as well as the two capstans 14 and 16.

When a stop signal is developed and the last signal was a LRF signal, the AND gate circuits 108 and 114 will develop an output signal FRP and FSV, respectively. The output signal from the AND gate 108 is an FRP signal representing pressure to one of the capstans and therefore does not affect the stop operation. However, the signal triggering the rectifier 40 provides an extinguish signal, as previously described. All of the other AND gates 106, 110, 112, 116, 118 and 120 will not develop any output signals. Therefore the valve associated with all the other elements except the brake element 20 will have a relatively high pressure applied thereto.

It is understood throughout this description that when the direction of the tape is to be changed the tape must first be stopped by appropriate signals. The stopping is followed by a subsequent set of signals to drive the tape in the reverse direction.

The various signals applied to the AND gates illustrated in FIGURE 3 which indicate the conditions of tape movement, i.e., LRF, LRB, LSF, LSB signals, may be derived from within the computer system. The computer system may involve relatively simple AND gates, OR gates and flip-flop circuits to generate these signals.

A simplified block diagram illustrating one type of logic circuit for generating such signals is shown in FIGURE 5. A forward signal (F) may be applied to an AND gate 128, along with a run (R) signal to produce a forward (FR) output signal. An R and backward (B) signal may be applied to an AND gate circuit 130 to produce a backward run (BR) signal. The output signals from the AND gates 128 and 130 may be applied to OR gate circuits 132 and 134, respectively. An LRB signal is also applied to the OR gate 132 and an LRF signal is also applied to the OR gate 134. The signals from the OR gates 132 and 134 produce output signals to control the operating state of a flip-flop circuit 136. The flip-flop circuit 136 will produce signals representing last run forward (LRF) and last run backward (LRB). These signals from the flip-flop circuit 136 may be applied to the various AND gate circuits illustrated and described in connection with FIGURE 4. For example, the LRF signal is applied to the AND gate circuit 108, the LRB signal is applied to the AND gate 112, the LRF signal is applied to the AND gate circuit 114 and the LRB signal is applied to the AND gate circuit 118.

In addition to being applied to the AND gates, as indicated these signals are also used to generate additional signals to indicate last stop forward (LSF) and last stop backward (LSB) conditions. This may be seen by the blocks on the bottom half of FIGURE 5. It is noted that the circuitry on the top and bottom halves of FIGURE 5 may be cross-coupled with one half of the circuit generating signals for the other half, and vice versa.

LRF and S signals are applied to an AND gate circuit 138 to produce an output signal which is applied to an OR gate 140. An LSB signal is also applied to the OR gate 140, either of which signal may be used to produce an LSF signal at the output of the flip-flop 142.

LRB and S signals are applied to an AND gate circuit 144 to produce an output signal which is applied to OR gate 146. An LSF signal is also applied to the OR gate circuit 146 to produce an LSB signal at the flip-flop circuit 142.

The flip-flop circuit 142 will generate output signals LRF and LRB dependent upon the nature of the input signals applied thereto. The output signal from the flip-flop 142 may be applied to the various AND gate circuits illustrated in FIGURE 4. For example, the LSF signal is applied to the AND gate circuit 116, and the LSB signal is applied to the AND gate circuit 120. The specific circuits illustrated by blocks in FIGURES 4 and 5 are not directly related to the control circuit of the present invention but have been described generally in order to illustrate one way in which the control circuit of FIGURE 3 may be actuated.

The present invention has provided a fast means for changing the operating conditions of a plurality of elements in a tape transport system. This speed is made possible by the almost immediate start and stop operations made possible by a number of elements such as the pulse generator 104, which provides pulse signals between oscillator pulse signals, the extinguish transformers 90 and 98, wherein one input power signal will control the operating conditions of two elements, and the charging and discharging circuits including the capacitors 86 and 96, which operates quickly with a minimum of power input requirements.

The embodiments of the invention in which an exclusive property or privilege is claimed are defined as follows:

1. In combination with first and second circuits each adapted to be in a first or second state of operation, a center tapped transformer having first and second halves, a capacitive network, means for charging said capacitive network through said first half of said transformer when said first circuit is in said first state of operation, means for driving said second circuit to said first state of operation to discharge said capacitive network through said second half of said transformer to induce a signal in said first half of said transformer driving said first circuit to said second state of operation.

2. The invention as set forth in claim 1 wherein the charging of said capacitive network through said first half of said transformer induces a signal in said second half of said transformer to drive said second circuit to said second state of operation.

3. In combination with first and second silicon controlled rectifier circuits to be driven to conducting or nonconducting states, a first source of potential for operating said first silicon controlled rectifier circuit, a second source of operating potential for operating said second silicon controlled rectifier circuit, a center tapped transformer having first and second halves, a capacitor network connected to the center tap of said transformer, means for charging said capacitor from said first source of potential through a first half of said transformer when said first silicon controlled rectifier is conducting, the current through said first half of said transformer inducing a voltage across the second half of said transformer to cause said second silicon controlled rectifier circuit to be nonconducting, means for driving said second silicon controlled rectifier circuit to a conducting state to cause said capacitor to discharge through said second half of said transformer and said second silicon controlled rectifier circuit, the current through said second half of said transformer inducing a voltage in said first half to cause said first silicon controlled rectifier to be non-conducting.

4. In combination with a valve mechanism for connecting a source of relatively low or high pressure to an element, first and second silicon controlled rectifier circuits to be driven to conducting or non-conducting states, a first source of potential for operating said first silicon controlled rectifier circuit, a second source of operating potential for operating said second silicon controlled rectifier circuit, a center tapped transformer having first and second halves for actuating said valve mechanism to connect either the source of low or high pressure to said element dependent upon the operation of said transformer, a capacitor network connected to the center tap of said transformer, means for charging said capacitor through a first half of said transformer whereby the current through said first half of said transformer actuates said valve mechanism, the current through said first half of said transformer inducing a voltage across the second half of said transformer to cause said second silicon controlled rectifier circuit to be non-conducting, means for driving said second silicon controlled rectifier circuit to a conducting state to cause said capacitor to discharge through said second half of said transformer, the current through said second half of said transformer actuating an associated valve mechanism, the current through said second half of said transformer inducing a voltage in said first half to cause said first silicon controlled rectifier to be non-conducting.

5. In combination with a tape driving system for driving tape in either of two directions comprising four elements including a pair of counter rotating capstans for driving said tape and a pair of brakes for braking said tape, a plurality of valve mechanisms including one associated with each of said capstans and brakes for selectively applying either a low or high pressure to said capstans and said brakes to cause engagement or disengagement with said tape, a center tapped transformer including first and second coils associated with each said valve mechanisms disposed to selectively actuate said valve mechanisms, first and second of silicon controlled rectifier circuits adapted to be driven to conducting or non-conducting states, a capacitor network connected to the center tap of said transformer, means for charging said capacitor through said first coil of said transformer, the current through said first coil inducing a voltage across said second coil of said transformer to cause said second silicon controlled rectifier circuit to be non-conducting, means for driving said second silicon controlled rectifier circuit to a conducting state to cause said capacitor to discharge through said second coil of said transformer and said second silicon controlled rectifier circuit, the current through said second coil of said transformer inducing a voltage in said first coil to cause said first silicon controlled rectifier to be non-conducting, a source of input signals, means for applying said input signals to selected ones of said coils of said transformer, said input signals being operative to actuate said valve mechanisms so that low pressure is applied to one of said four elements to cause said tape to be engaged therewith and high pressure is applied to the other three elements to cause said tape to be disengaged therefrom whereby said tape is driven in a predetermined direction, or stopped dependent upon which of said four elements receives low pressure.

6. The invention as set forth in claim 5 wherein four pairs of silicon controlled rectifiers similar to said first and second silicon controlled rectifier circuits are provided to actuate said four valve mechanisms.

7. The invention as set forth in claim 6, wherein two brakes and two capstans in a tape transport system are associated with said four valve mechanisms.

8. In combination with a tape driving system for driving tape in either of two directions comprising four elements including a pair of counter rotating capstans for driving said tape and a pair of brakes for braking said tape, a plurality of valve mechanisms including one associated with each of said capstans and brakes for selectively applying either a low or high pressure to said capstans and said brakes to cause engagement or disengagement with said tape, a center tapped transformer including first and second coils associated wtih each of said valve mechanisms disposed to selectively actuate said valve mechanisms, first and second of silicon controlled rectifier circuits adapted to be driven to conducting or non-conducting states, a first source of potential for operating said first silicon controlled rectifier circuit, a second source of operating potential for operating said second silicon controlled rectifier circuit, a capacitor network connected to the center tap of said transformer, means for charging said capacitor through said first coil of said transformer, the current through said first coil inducing a voltage across said second coil of said transformer to cause said second silicon controlled rectifier circuit to be non-conducting, means for driving said second silicon controlled rectifier circuit to a conducting state to cause said capacitor to discharge through said second coil of said transformer and said second silicon controlled rectifier circuit, the current through said second coil of said transformer inducing a voltage in said first coil to cause said first silicon controlled rectifier to be non-conducting, a source of input signals, means for applying said input signals to selected ones of said coils of said transformer, said input signals being operative to actuate said valve mechanisms so that low pressure is applied to one of said four elements to cause said tape to be engaged therewith and high pressure is applied to the other three elements to cause said tape to be disengaged therefrom whereby said tape is driven in a predetermined direction, or stopped dependent upon which of said four elements receives low pressure.

9. The invention as set forth in claim 8 wherein four pairs of silicon controlled rectifier circuits similar to said first and second rectifier circuits are provided to actuate said four valve mechanisms.

10. The invention as set forth in claim 9 wherein two transformers and two capacitors are provided, with one of said transformers and said capacitors controlling the operation of two pairs of said silicon controlled rectifier circuits and the other controlling the operation of said other two pairs of silicon controlled rectifier circuits.

11. The invention as set forth in claim 10 wherein said input signals comprise pulse signals from an oscillator and a pulse generator.

References Cited by the Examiner

UNITED STATES PATENTS

| | | | |
|---|---|---|---|
| 891,568 | 6/1908 | Runnion et al. | 251—129 X |
| 3,093,283 | 6/1963 | Hodges | 226—95 |
| 3,122,295 | 2/1964 | Davidson et al. | 226—95 X |
| 3,151,795 | 10/1964 | Guillim | 226—95 |
| 3,165,694 | 1/1965 | Young | 320—1 X |
| 3,171,972 | 3/1965 | Wilkinson. | |
| 3,231,163 | 1/1966 | Chambers | 226—95 |
| 3,268,139 | 8/1966 | Edwards | 226—95 |
| 3,270,932 | 9/1966 | Smith | 226—97 |

M. HENSON WOOD, Jr., *Primary Examiner.*

J. N. ERLICH, *Assistant Examiner.*